March 18, 1969

D. B. HUNKAR 3,433,956

AUTOMATIC SAMPLE CHANGER AND MEASURER FOR RADIOACTIVE
MATERIALS WITH PULSATING GAS PURGING

Filed April 19, 1965

INVENTOR
Denes B. Hunkar
BY Wood, Herron & Evans
ATTORNEY

United States Patent Office 3,433,956
Patented Mar. 18, 1969

3,433,956
AUTOMATIC SAMPLE CHANGER AND MEASURER FOR RADIOACTIVE MATERIALS WITH PULSATING GAS PURGING
Denes B. Hunkar, 2983 Springer Ave., Cincinnati, Ohio 45208
Filed Apr. 19, 1965, Ser. No. 448,963
U.S. Cl. 250—106
Int. Cl. G21h 5/00
3 Claims

ABSTRACT OF THE DISCLOSURE

Apparatus for measuring the radioactivity of a plurality of samples, wherein the samples are automatically transferred by a slide plate from a loading chamber through a gas tight seal to the counting chamber, then to a discharge station. The counting chamber is purged by gas flow which is caused to pulsate as a series of exhaust vents are sequentially opened by movement of the slide plate. Movement of the slide plate is controlled by means responsive to its position.

---

This invention relates to radiation detection, and more particularly, to an apparatus for continuously and automatically measuring the radioactivity of a plurality of radioactive samples.

In the past, testing and measuring of radioactive samples has been primarily a manual operation, requiring the close attention of an operator for each measurement. Because of the dangers inherent in the handling of such materials, past practice has required bulky and complicated shielding arrangements for protection of the operator which has added to the difficulties and slowness of the measuring procedures.

In an effort to overcome the disadvantages of manual operation, automatic sample measuring devices have been described which effect substitution of remote mechanically and electrically controlled devices for the human operator. However, the complexity and bulkiness of such previously suggested devices, although they may have obviated a great deal of the safety hazards, have failed to speed up the rate of sample measurement and have, by their very complexity, presented difficulties in cost, maintenance, repair, and operation which oftentimes outweigh their theoretical and practical advantages.

It is an object of this invention to provide an automatic radioactive sample changing and measuring system which is relatively free from the disadvantages of the prior art.

It is another object of this invention to provide an automatic radioactive sample changing and measuring system which is made up of relatively few moving parts, and requires little if any maintenance, repair, or attention over an extended period.

Figure 1:
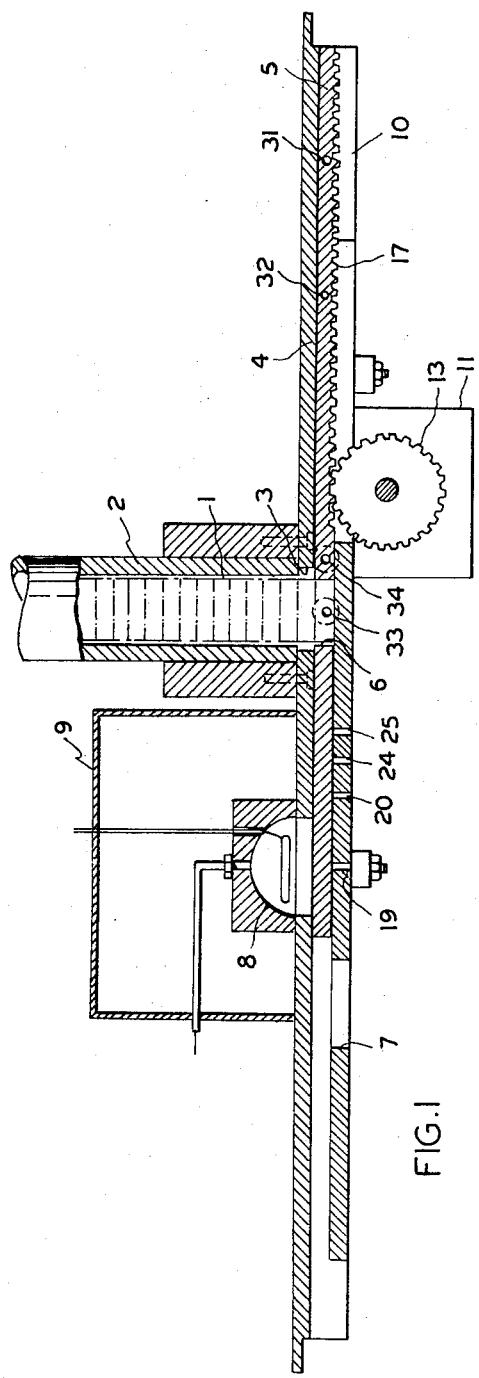
Figure 2:
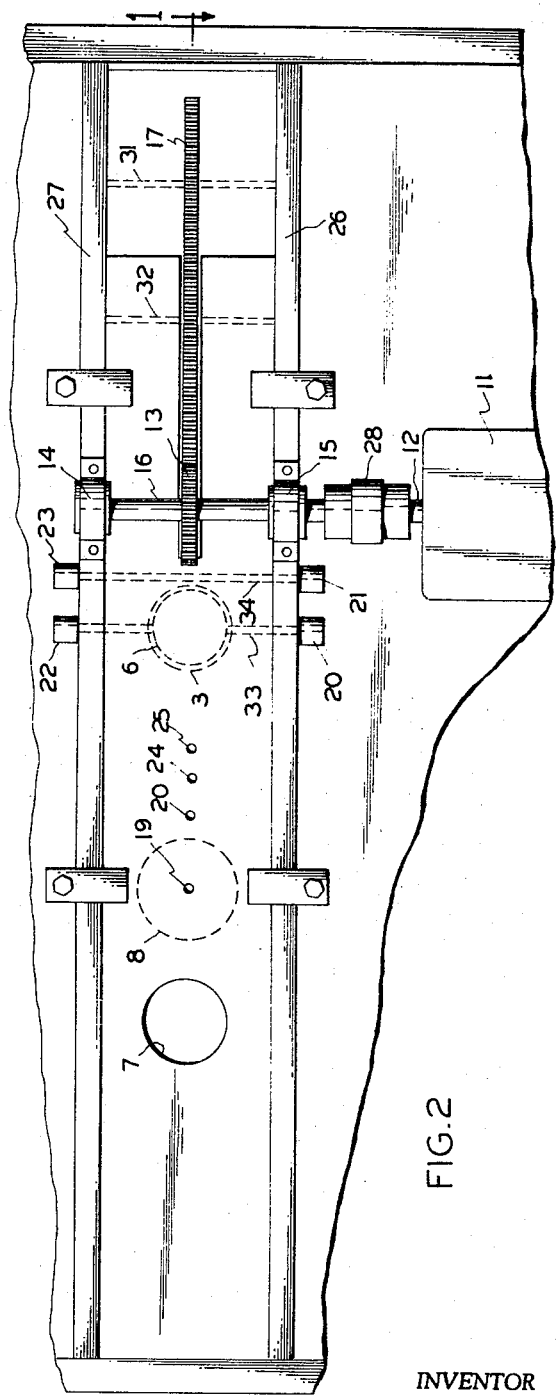

Other objects and advantages of the invention will be apparent by reference to the following detailed description taken in connection with the accompanying drawings, in which:

FIGURE 1 is a vertical sectional view of the automatic sample changer of this invention, this section being taken on the line 1—1 of FIGURE 2; and FIGURE 2 is a horizontal bottom view of the changer of this invention.

The radioactive samples to be measured are placed in non-interlocking planchets 1 or sample holders and a multiplicity of planchets vertically arranged in a stack is loaded manually into the vertical sample loading tube 2. The stack of planchets will fall by gravity to the lower part of loading tube 2, which tube or magazine extends down through stationary top plate 4 to just above hole 6 of sliding plate 5.

At the start of the automatic sample changing cycle, hole 6, which is located in sliding plate 5, is positioned under loading tube 2. After loading the stack of planchets into loading tube 2, the bottom planchet of the stack will fall through hole 3 of the stationary top plate 4, into hole 6 of sliding plate 5.

The presence of this planchet in hole 6 will interrupt the passage of light from electric light bulb 22 towards photocell 20 through hole or aperture 33 thereby deactivating photocell 20. This deactivation will interrupt an electric signal going from photocell 20 to an outside electronic programmer. The signal interruption will cause the programmer to start electric motor 11 which is in operative contact and always controlled by the outside electronic programmer. The rotation of motor 11 and gear 13 attached to gear shaft 16 is such that it will cause the leftward movement of rack 17 and sliding plate 5 to which rack 17 is fastened.

When horizontal hole 32 in sliding plate 5 reaches the centerline of bulb 23 and photocell 21 the free passage of light from bulb 23 to photocell 21 will send an electric signal to the outside electronic programmer. The receipt of this signal will cause the programmer to stop the rotation of electric motor 11. The stopping of motor 11 will also stop the linear motion of sliding plate 5. In this phase of the automatic changing cycle, planchet 1 will be positioned under detector 9 for counting and/or measuring of radioactivity of the sample in planchet 1.

The mode and duration of measuring or counting of radioactivity of the sample under detector 9 is under the control of the outside electronic programmer. At the conclusion of measuring and counting, the programmer will initiate the further leftward motion of sliding plate 5.

When hole 31 in sliding plate 5 reaches the centerline connecting photocell 21 and bulb 23, photocell 21 will become activated and it will send an electric signal to the programmer which in turn will stop the rotation of electric motor 11 and gear 13. Stopping of gear 13 will stop the linear leftward movement of sliding plate 5. Hole 6 of sliding plate 5 will be above hole 7 of stationary bottom plate 10. In this position, planchet 1 will be discarded by gravity through hole 7 in bottom plate 10. After a suitable time delay, introduced by the outside electronic programmer, the rotation of motor 11 will be reversed by the electronic programmer and sliding plate 5 will start moving to the right. When hole 34 in sliding plate 5 reaches the centerline connecting photocell 21 and bulb 23, photocell 21 will be activated and will send an electric signal to the electronic programmer which in turn will stop the rotation of motor 11. At this point, hole 6 in sliding plate 5 will be positioned under loading tube 2. The next non-interlocking planchet will then fall from the bottom end of the stack in loading tube 2 into hole 6 in sliding plate 5. The presence of this planchet in hole 6 will be detected by photocell 20 and the second changing and counting cycle will be started by the electronic programmer.

This cyclic operation is repeated as long as there are planchets to be counted and measured in loading tube 2.

After discarding the last planchet through hole 7, the sliding plate 5 will return to the initial position with hole 6 under loading tube 2. Since there will be no planchet dropped by gravity into hole 6, photocell 21 remains activated and the electric signal to the electronic programmer from photocell 21 will not be interrupted. The programmer will initiate no more changing cycle, and the sample changing mechanism will remain at standstill until a new stack of planchets is loaded into loading tube 2.

The counting of radioactivity of the samples contained in the planchets is conducted by detector 9 with the assistance of outside counting, scaling, controlling, and programming equipment. These components of an integrated system are not part of this invention.

This sample changer mechanism is well suited for counting of radioactivity by the application of so-called gas flow counters. The gas flow may be introduced to the space surrounding planchet 1 in the counting position through gas flow detector 9. Several holes or ports are provided in stationary bottom plate 10 to facilitate the gas flow for counting purposes. In the illustrative example, in FIGURES 1 and 2, four holes are shown, designated by numbers 19, 20, 24, and 25. These holes allow the passage of gas from the space surrounding the sample in planchet 1 to the outside atmosphere across stationary bottom plate 10 in certain positions of sliding plate 5 relative to stationary top plate 4. The location of holes 19, 20, 24, and 25 is such that their interplay with holes 6 and 8 will cause transient surges of the gas flow rate to the atmosphere while sliding plate 5 is in motion. These surges are instrumental in purging gas from the planchets located in hole 6, and they have a desirable effect upon the accuracy of gas flow counting of radioactivity. The tight fit between sliding plate 5 and stationary plates 4 and 10 ensure the containment of counting gas with little if any leakage. Sliding plate 5 is supported by stationary bottom plate 10 which is fastened by suitable fasteners to top plate 4. The horizontal movement of sliding plate 5 is limited by sidebars 26 and 27 which are fastened also to top plate 4. Shaft 16 carrying gear 13 is supported by bearing pillow blocks 14 and 15. Coupling 28 serves as connecting element between motor shaft 12 and gear shaft 16.

As will be obvious from the foregoing description, the device of this invention has but one moving part, aside from the driving motor, namely the sliding plate 5, and because of its relatively small size and simplicity, it is readily adapted for extensive and complete shielding from the operator at all times. Although specific operation and embodiments of this invention have been disclosed, it will be obvious to those skilled in the art that various changes and modifications may be made without departing from the scope and spirit of the invention as defined in the appended claims.

What is claimed is:
1. In apparatus for automatic measurement of radioactivity of a plurality of samples, a vertically disposed sample receiving and dispensing magazine adapted to contain a stack of sample holders, said magazine having an open bottom end, a sliding plate disposed for linear sliding movement upon a stationary base plate and covered by a tight fitting stationary top plate, said magazine extending to said sliding plate through a hole in the stationary top plate, the sliding plate being movable at a right angle to said magazine, said sliding plate having a sample holder receiving hole vertically therethrough for receiving a sample holder from the bottom of said stack, a motor connected to drive said sliding plate linearly between said top plate and base plate, a programmer for controlling the operation of said motor, said sliding plate having spaced first, second, third and fourth apertures extending through it, first and second photocells each actuable by light impinging thereon through one of said apertures when said aperture is aligned with light source means on an opposite surface of said sliding plate from said photocell, each said photocell connected to actuate said programmer, said first aperture intersecting said sample receiving hole so that the presence of a sample holder in said receiving hole interrupts light impinging on said first photocell, said programmer being adapted thereupon to start said motor to move said sliding plate, said second aperture positioned to permit actuation of said second photocell when the sample holder receiving hole in the sliding plate is aligned with a detector for measuring radioactivity, said programmer being responsive thereto to stop said motor and to control the duration of radioactivity measurement by said detector and thereafter to start said motor to move the sample holder receiving hole in said sliding plate further from said magazine, said third aperture positioned to permit actuation of said second photocell when the sample holder receiving hole is over a sample holder discharge hole in said base plate, said programmer being responsive thereto to stop said motor for discharge of said sample holder through said discharge hole and then to reverse said motor to move to said sample holder receiving hole back toward said magazine, said fourth aperture positioned to permit actuation of the second photocell when the sample holder receiving hole is disposed beneath said magazine, said programmer being responsive thereto to stop said motor.

2. The apparatus of claim 1 in which the base plate is provided with a plurality of ports adapted to vent gas from the space surrounding the sample holder in the sliding plate,
said ports being positioned to sequentially come into communication with the sample holder receiving hole in the sliding plate and thereby cause transient surges of gas venting flow while the sliding plate is in motion.

3. Apparatus for automatic measurement of radioactivity of samples, comprising:
a vertical magazine adapted to contain a plurality of samples,
a movable plate disposed horizontally between stationary top and bottom plates which facially engage opposite surfaces of said movable plate, said magazine extending through said top plate to said movable plate,
said movable plate having a sample hole therein for receiving a sample from the bottom of said stack,
a motor for moving said movable plate,
radioactivity measuring means mounted over a counting hole in said top plate,
a sample discharge hole in said bottom plate spaced from said measuring means,
means controlling the operation of said motor to move said movable plate so that the sample hole therein is moved from a starting poistion beneath said magazine to said counting hole for sample counting, then to said discharge hole for sample discharge, then to starting position,
said apparatus being further characterized by the provision of a series of spaced gas venting ports in one of said top and bottom plates which are positioned to come sequentiallly into communication with said counting hole through said sample hole as said movable plate moves, to vent gas therefrom in surges.

References Cited
UNITED STATES PATENTS 2,843,753   7/1958   Meeder ............ 250—106
3,052,353   9/1962   Pritchett .......... 250—106

FOREIGN PATENTS 1,269,736   7/1961   France.

RALPH G. NILSON, *Primary Examiner.*

SAUL ELBAUM, *Assistant Examiner.*

U.S. Cl. X.R.
250—223